Nov. 30, 1954 C. E. J. BRANDT 2,695,779
ELASTIC CONNECTION BETWEEN MEMBERS SUBMITTED TO A RELATIVE
RECIPROCATION AND APPLICATIONS THEREOF
Filed Oct. 17, 1950 5 Sheets-Sheet 1

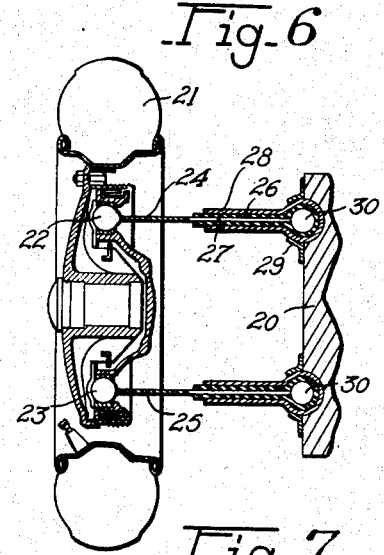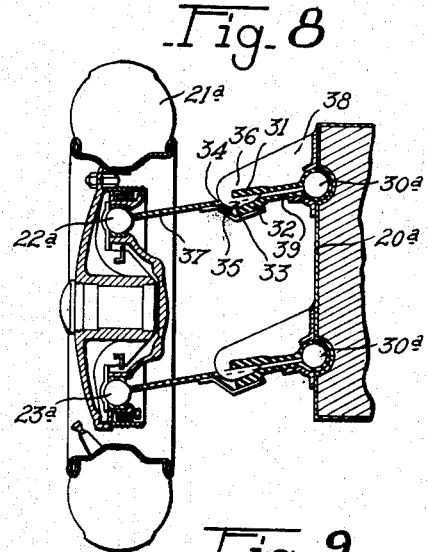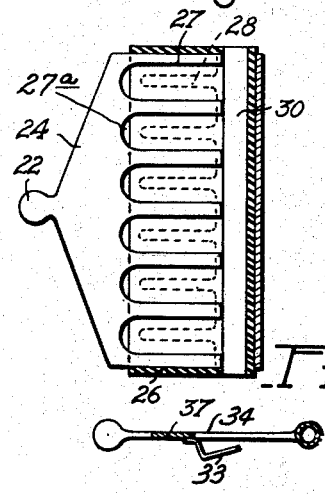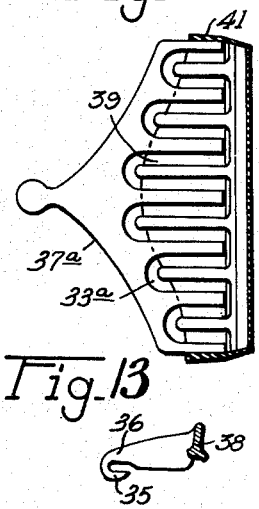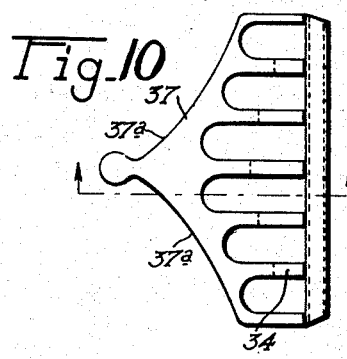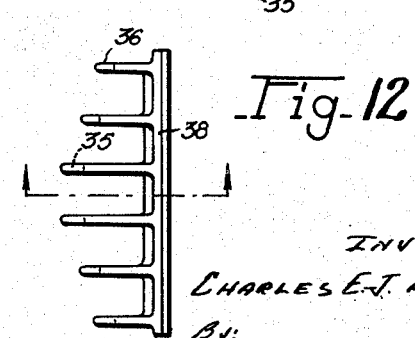

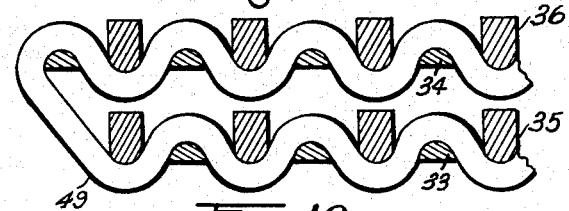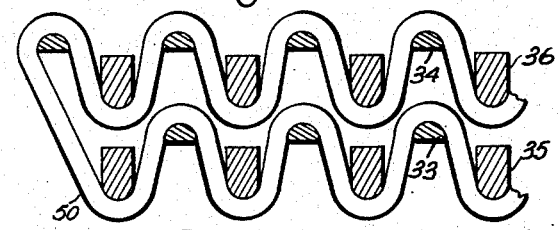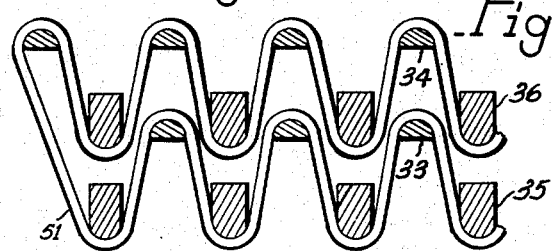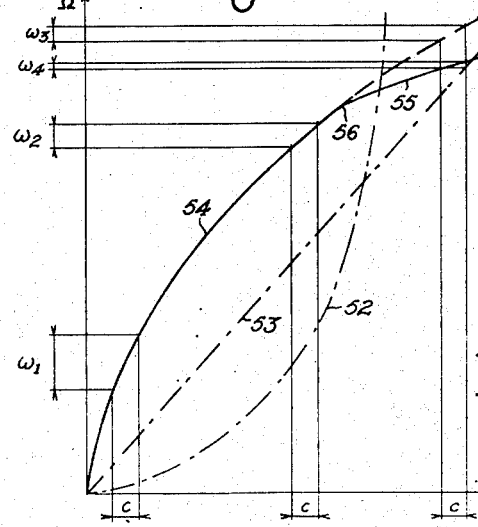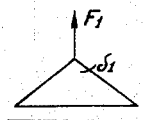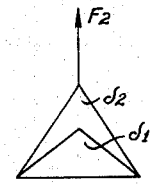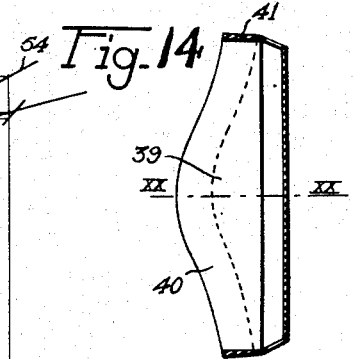

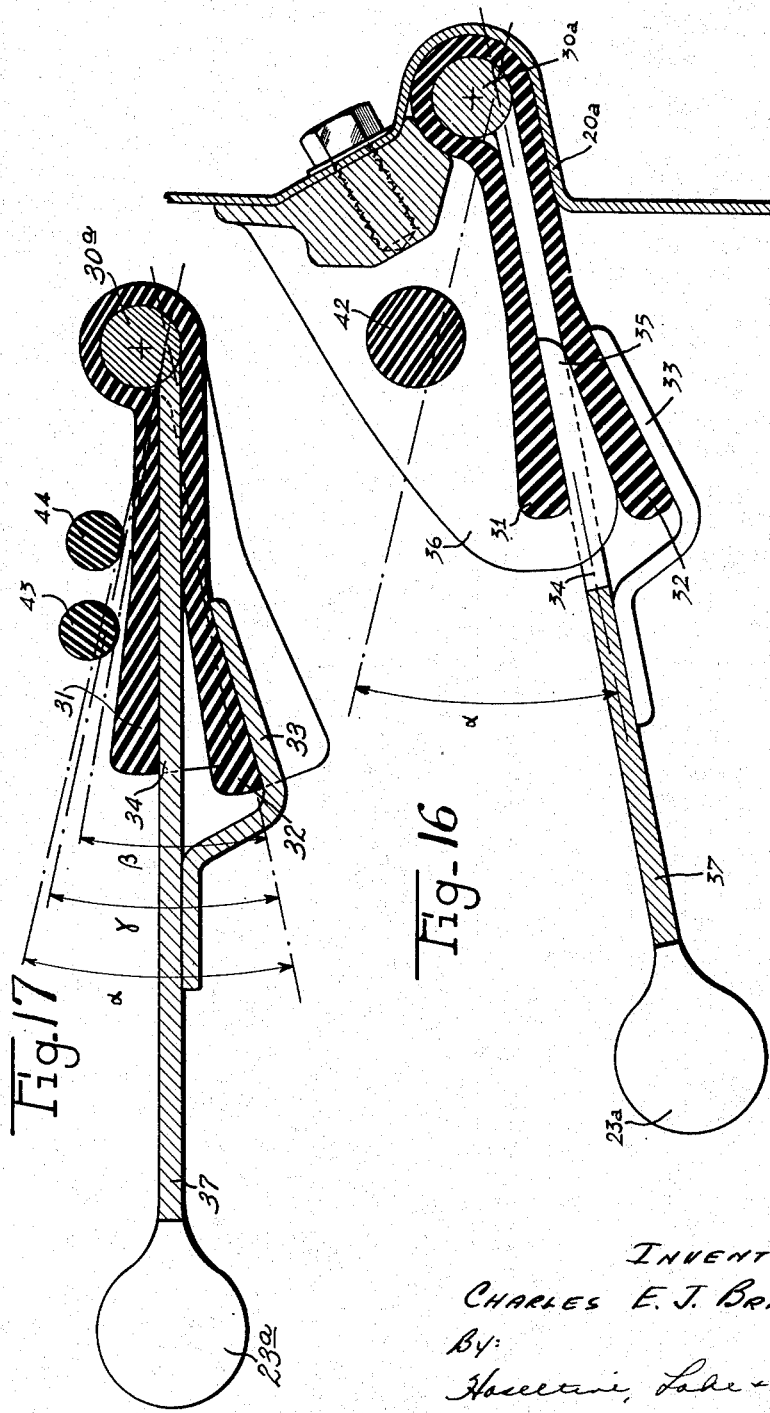

Nov. 30, 1954         C. E. J. BRANDT        2,695,779
ELASTIC CONNECTION BETWEEN MEMBERS SUBMITTED TO A RELATIVE
RECIPROCATION AND APPLICATIONS THEREOF
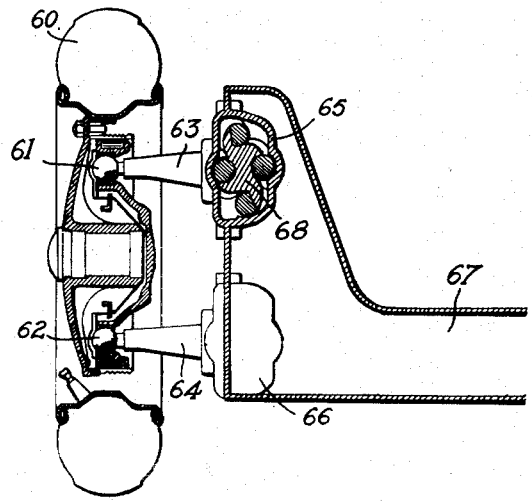
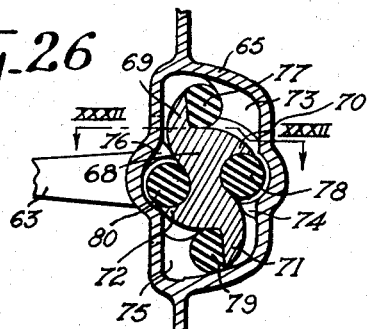
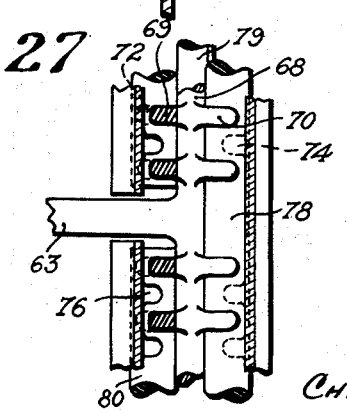

United States Patent Office 2,695,779
Patented Nov. 30, 1954

2,695,779

ELASTIC CONNECTION BETWEEN MEMBERS SUBMITTED TO A RELATIVE RECIPROCATION AND APPLICATIONS THEREOF

Charles Emile Jules Brandt, Paris, France

Application October 17, 1950, Serial No. 190,500

Claims priority, application France February 17, 1947

9 Claims. (Cl. 267—21)

The present specification is a continuation-in-part of my prior co-pending application Serial No. 8,370, filed on February 14, 1948, for "Improvements in vehicle suspension means," now abandoned, and certain portions of the present specification correspond to portions of said prior application.

My invention has for its object an elastic device for interconnecting a stationary member and a member movable in oscillation with respect to said stationary member and applications thereof particularly intended for suspensions of vehicles adapted to move over ground, chiefly vehicles of the type including independent wheels each of which is connected with the frame through a parallelogram pivotally connected to said wheel through ball joints and to the frame through elastic interconnecting device.

When two members are submitted to such a relative oscillation, it has been proposed to resort to an elastic connection adapted to cut out any wear and noise between said members, said elastic connection including generally an inner part and an outer part that are interconnected by means of a ring of elastic material such for instance as natural or synthetic rubber, said ring being rendered fast with the members to be connected either through compression or through adherence. In such pivotal connections, the rubber may be submitted during the deformations produced by the oscillatory movement either to a compression or to a torsional stress, but in either case the resulting elastic torque increases less speedily than the angular displacements.

My invention has for its main object to provide an elastic pivotal connection wherein the torque produced increases more speedily than the angular relative displacement between the parts forming the pivotal connection.

According to my invention, the elastic device for interconnecting a stationary member and a member movable in oscillation with respect to said stationary member includes a yielding part constituted by one or several units of elastic material such as natural or synthetic rubber, each of said elements being positioned between the teeth of a comb-shaped element carried by one of said members and portions or crossbars of a second element carried by the other member, which portions limit parts of said second element in register relationship with said teeth and which are shaped so as to allow the relative oscillatory displacement of said elements, means for holding the ends of said elastic unit or units being provided.

When the two elements move with reference to one another, the corresponding elastic unit or units, sheets for example, are submitted to an elongation which generates, for a predetermined modification in torque, substantial angular shiftings for small angles of oscillation of the arrangement and extremely small angular shiftings for large angles of oscillation of the arrangement and conversely.

It is thus possible to obtain an elastic torque that increases gradually with the angular shifting and at a higher rate than the latter.

Advantageously additional elements or masses of elastic materal may engage one of the comb-shaped units towards the end of the angular relative travel between the members to be connected so as to take part of the load.

Preferably the number of elastic units is an even one, the ends of each pair of two units being interconnected so as to form a flat endless unit adapted to be submitted to transversal forces, without receding at its ends.

According to a preferred embodiment, when a single flat endless element is used, it is provided with an extension connecting its two strands so as to form an open casing adapted to surround the rocking axis of the movable element. Said bracelet-shaped casing is preferably molded to a size smaller than the utilisation size whereby it may, when mounted, be stretched transversely over the element assembly, on one hand, and, on the other hand, tighten round the virtual axis of oscillation.

It is then possible to provide for the holding in place of the elastic units after mounting, through the reaction exerted on the elements by the actual elastic masses without any positive securing either through bolt, spindle or cotter passing through said elastic masses or without any bonding of the latter on the element assembly.

Consequently at any moment, the elastic units are dismountable and therefore interchangeable, which allows easily repairing the elastic connection or modiflying its resisting torque.

The elastic units may assume a shape, a cross section and a length that vary according to the torque, angle of shift and damping required.

My invention has for a further object various commercial applications of the elastic connection specified hereinabove and chiefly its application to the suspension of vehicles running over ground and more particularly of these including independent wheels connected with the frame through parallelograms pivotally connected to the wheels through ball joints or the like means and to the frame through elastic connection means of the type disclosed hereinabove. It is thus possible to provide a pleasant and smooth operation of the suspension under normal running conditions, while the suspension remains reliable at high speeds through the automatic hardening of the elastic connection when the oscillations of the parallelograms increase in amplitude; furthermore, this cuts out any rigid connection with the frame, which leads to a silent self-damped suspension that requires no lubrication.

The following description given with reference to accompanying drawings by way of exemplification and by no means in a binding sense, will allow ascertaining how the invention may be executed in practice. In said drawings.

Fig. 6 illustratives on a reduced scale an arrangement for the suspension of vehicle wheels incorporating the elastic connection according to the invention.

Fig. 7 is a plan view of the component elements the association of which forms the elastic connection illustrated in Fig. 6.

Fig. 8 is a modified embodiment of the suspension of Fig. 6.

Fig. 9 is a plan view of the component elements the assembly of which forms the elastic connection incorporated in the suspension of Fig. 8.

Figs. 10 and 11 on one hand and Figs. 12 and 13 on the other hand illustrate respectively in plan and elevational views the two comb systems of the suspension means illustrated in Fig. 8.

Fig. 14 is a plan view of the elastic element incorporated in the suspension illustrated in Fig. 8.

Fig. 15 is a cross-sectional view of Fig. 14 through line XX—XX thereof.

Fig. 16 is a view on a larger scale in its inoperative position of one of the arms of the parallelogram in the suspension illustrated in Fig. 8, to which arm is associated an element adapted to increase the torque when approaching the limit of the angular shifting of said arm.

Fig. 17 is a view similar to that illustrated in Fig. 16, the arm lying in its operative position, with the incorporation of two successive elements adapted to increase the torque when approaching the limit of the allowed angular movement of the arm.

Figs. 18 to 20 are views of the elastic ring-shaped unit for various relative angles of rotation of the movable combs.

Figs. 21 to 23 are diagrams giving respectively the torques corresponding to the deformations illustrated in Figs. 18 to 20.

Fig. 24 is a diagram showing the value of the rotary angles of the arm as functions of predetermined elastic resistant stresses.

Fig. 25 is a modified embodiment of the suspensions illustrated in Figs. 6 and 8, incorporating a multiplicity of elastic members.

Fig. 26 is a partial view, on a larger scale, of the embodiment illustrated in Fig. 25.

Fig. 27 is a cross-section of Fig. 26 through line XXXII—XXXII thereof.

Figure 1:
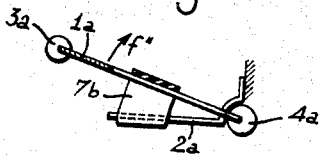
Fig. 1 is a diagrammatic illustration of an elastic connection according to the invention when operative.
Figure 2:
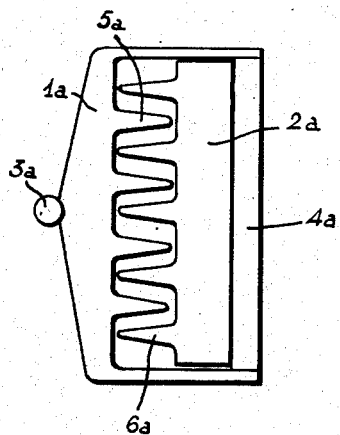
Fig. 2 illustrates diagrammatically the comb systems incorporated in the arrangement in Fig. 1.

In the embodiment illustrated in Figs. 1 and 2, the elastic connection includes a stationary part $2a$ and a part $1a$ secured at $3a$ to one of the members not illustrated and which assumes an oscillating movement, said part $1a$ being adapted to move round the axis $4a$ rigid with the stationary member carrying the part $2a$. Said parts are formed as combs the teeth $5a$ and $6a$ of which are arranged in interengaging formation. Between the two parts $1a$ and $2a$ is fitted a rubber strip $7b$ engaging in succession the upper surfaces of the teeth $5a$ and the lower surfaces of the teeth $6a$. Consequently, if stresses are exerted on the part $1a$ that are directed in the direction of the arrow $f''$ (Fig. 1), the teeth $5a$ and $6a$ bear against the strip $7b$ and have a tendency to stretch it as illustrated in Fig. 1 as the part $1a$ rocks round the pivotal axis $4a$.

Figure 3:
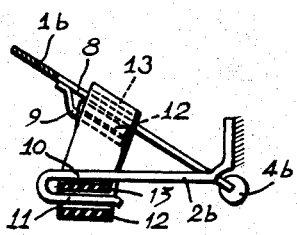
Fig. 3 is a diagrammatic cross-section of a modification wherein the elastic element assumes an endless shape.
Figure 5:
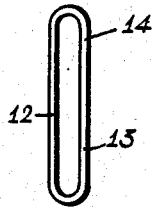
Figs. 4 and 5 illustrate respectively in plan and in end view the elastic element incorporated in the arrangement of Fig. 3.
Figure 4:

In the embodiment illustrated in Fig. 3, each part $2b$ and $1b$, the latter being pivotally secured at $4b$, is provided with two series of superposed teeth, the teeth 8 and 9 corresponding to the member $1b$ and the teeth 10 and 11 to the member $2b$; said teeth act on two rubber strips 12 and 13 that are interconnected through their ends so as to form an endless member or bracelet 14 as illustrated in Figs. 4 and 5.

Fig. 6 illustrates a suspension for a vehicle wheel incorporating a parallelogram associated with the arrangement the principle of which has been disclosed in Figs. 1 and 2.

The wheel 21 is pivotally secured at 22 and 23 through ball joints carried by axle sections 24 and 25 forming elements of the parallelogram incorporated to the suspension. The axle sections 24 and 25 are pivotally secured to the pivots 30 on the frame 20 of the vehicle. Each axle section such as the axle section 24 is furthermore longitudinally wrapped inside a rubber sheath 26 passing between portions or crossbars 27 limiting apertures $27a$ cut in the movable axle section 24 and stationary pairs of teeth 28 cut in the stationary comb shaped support 29 rigid with the frame 20 and in register relationship with said apertures $27a$. The rubber sheath 26 surrounds the pivotal axis 30 of the axle section 24; the manner of cutting the movable apertures $27a$, the crossbars 27 and the stationary teeth 28 is clearly apparent in Fig. 7.

In the embodiment illustrated in Fig. 8, there is incorporated to a wheel suspension the arrangement the principle of which has been disclosed with reference to Figs. 3 to 5. The wheel $21a$ is pivotally secured at $22a$ and $23a$ through ball joints carried by axle sections 37 forming part of the parallelogram of the suspension. Each of said axle sections 37 pivotally secured at $30a$ to the frame $20a$ is formed with apertures $33a$ limited by portions or crossbars 34 under which are fitted parts 33 defining open spaces with said crossbars. The stationary comb-shaped element 38 is formed in register relationship with said apertures with C-shaped teeth located in planes perpendicular to $30a$. An elastic endless element comprising two sheets 31 and 32 simultaneously embraces the wings 35 of the C-shaped teeth and the crossbars 34 while its outer sides bear simultaneously on the other wings 36 of said C-shaped teeth and on the parts 33.

The two rubber sheets 31 and 32 as illustrated in Figs. 14 and 15 are provided with a common web 39 surrounding the spindle $30a$ and they are connected at their free ends through the strips 41.

The parts of the sheets 31 and 32 that are in contact with the crossbars and the teeth are provided with bulges 40 (Fig. 15) adapted to cooperate in their fitting between the projections.

The bracelet thus obtained has a size that is slightly less than that occupied by it when inserted between the teeth, the crossbars and the parts. In the mounting, the rubber plates 31 and 32 are laid transversely over the wings 35 and the crossbars 34 and the rear edge 47 (Fig. 20) surrounds the spindle $30a$ and is submitted to compressional stresses.

Figs. 9 to 13 illustrate respectively the whole assembly and the separate cooperating members 37 and 38. It should be remarked that the outline in plan view of the member 37 shows two concave parts $37a$ adapted to allow a large angle of lock for the wheel when the latter is a steering wheel.

In Figs. 16 and 17 is illustrated on a larger scale one of the elastic connections illustrated in Fig. 8, said connection being shown in its inoperative condition in Fig. 16 and in its operative condition in Fig. 17.

In the embodiment illustrated in Fig. 16 there is shown furthermore a circular rubber member 42 secured to the sides of the stationary comb-shaped element and that is adapted when the axle section 37 rocks round the axis $30a$ to take part of the load as soon as said axle section 37 assumes an angular location approximating its extreme operative angle $\alpha$.

In Fig. 17 there are provided two such circular rubber members 43 and 44 that in succession take parts of the load for angular shiftings $\beta$ and $\gamma$ that are lower than the limit shifting $\alpha$ of the axle section 37.

Figs. 18, 19, 20 illustrate the successive deformations assumed by the elastic bracelet illustrated in Figs. 14 and 15 under the action of the movable parts 33 and crossbars 34 with reference to the stationary wings 35 and 36 of the C-shaped teeth and Figs. 21 to 23 give the torques corresponding to the deformations illustrated in said Figs. 18 to 20.

As said movable parts 33 and crossbars 34 engage deeper into it, the elastic bracelet assumes in succession the shapes 49, 50 and 51 and the corresponding stresses F1, F2, F3 increase at a greater rate than the engagement of the movable parts 33 and crossbars 34 with reference to the stationary wings 35 and 36 of the C-shaped teeth by reason of the increase in elongation, as provided by a reduction in the angles $\delta_1$, $\delta_2$, $\delta_3$, the angle $\delta$ defining the angle between the straight line connecting the bearing of one of the teeth, parts or crossbars pertaining to a stationary element or an axle section on the elastic bracelet with the bearing points of the two teeth, parts or crossbars to either side thereof in the corresponding axle section or stationary element.

The diagram in Fig. 24 illustrates the value of the angular location $\Omega$ of the axle section with reference to the resistant stresses C respectively in certain known connecting systems and in the elastic connection according to the invention.

In the case where the connecting system is of the type incorporating elastic connections including rubber members submitted to compression, to torsion or to elongation, the modification of the angular location as a function of the torque is given by the curve 52 that shows clearly that the elastic torque increases less speedily than the angular displacement.

In the case where the connecting system is constituted by metal springs, the resulting curve is formed by the straight line 53 corresponding to an increase of the torque that is proportional to the increase of the angular shifting.

In contradistinction, in the case of the elastic means according to the invention, as illustrated in Figs. 19 to 21 the angular variations $\Omega$ are represented as a function of the torque C by the curve 54; said curve shows clearly that for a same modification of the torque C the variation of the angular location of the axle section assumes values $\omega_1$, $\omega_2$ and $\omega_3$ that are smaller and smaller as the torque C increases. If the arrangement includes means producing an additional resistance in the vicinity of the limit of angular deformation, the curve 54 is depressed starting from point 56 and assumes the shape indicated at 55 and corresponding to the associated action of the actual elastic means and of the additional resistance generating means. It is thus apparent that for a same modification in torque C, the variation of the angle of rotation of the axle $\omega_4$ has a value less than the value ω₃ that would have been obtained without such additional means.

In the embodiment illustrated in Figs. 25 to 27 the wheel is pivotally secured at 61 and 62 to ball joints rigid with the axle sections 63 and 64 belonging to the parallelogram of the suspension. Said axle sections engage casings 65 and 66 mounted in the frame 67 of the vehicle and they terminate inside said casings with the transverse hubs 68.

Each transversal hub 68 is formed with four series of aligned teeth or projections 69, 70, 71 and 72.

In the gap provided between said projections may engage other projections 73, 74, 75 and 76 rigid with the corresponding casing, acting as teeth and limiting recesses formed in said casing. Between the cooperating teeth 69—73, 70—74, 71—75 and 72—76 are housed rubber masses 77, 78, 79 and 80 operating under the conditions disclosed hereinabove with reference to Figs. 6 and 8. Said masses 77 to 80 may belong to two annular elements as disclosed with reference to Figs. 3 and 8. Said annular element may be constituted either through the association of the masses 77 and 78 on one hand and 79 and 80 on the other hand, said annular elements assuming then the same lengths or again through the association of the masses 77 and 79 on one hand and 78 and 80 on the other hand in which case the annular elements would assume different lengths.

It should be noticed that the movable axle sections chiefly in the embodiments of Figs. 6, 8 and 25, are integral with the ball elements pivotally carrying the wheels and with the axles or hubs serving for the pivotal connection with the frame which allows reducing the number of parts to be made and to provide simultaneously for a great accuracy in the distance separating the two actual pivotal axes of said movable axle sections.

The different figures described hereinabove allow readily ascertaining the nature of the invention.

As applied to a suspension of the parallel motion type, this elastic connection with the frame provides an elastic torque that increases gradually and more rapidly than the angular shifting while additional resistances may also be added to the resisting torque when nearing the angular limit of travel.

The interengaging portions or teeth form also the structural members of the parallel motions in the suspension. The number of teeth portions, crossbars and parts, the thickness of the double elastic plate inserted between them, the number of such elastic double plates and the number of planes in which the teeth portions, crossbars and parts lie form the main factors for adjusting the value of the suspension torque.

Figs. 6 to 17 illustrate clearly how the securing of the elastic elements is ensured without any bolt, rivet, pivot or key passing through the elastic mass and is obtained solely through the holding of the parts through action thereon of the actual elastic mass.

The constitution of the endless elements as illustrated in Figs. 4, 5, 14, 15, 18, 19 and 20 that are submitted to transversal thrusts, cuts out any possibility of a local receding, chiefly at the ends of the rows of teeth, by reason of the continuity of said elements.

Lastly, Figs. 6, 7, 16 and 17 show that the pivotal connections between the rocking axle section and the frame is constituted by the elastic material that assumes the shape of a cylindrical casing or sheath surrounding the virtual axis of oscillation.

Obviously, without widening the scope of the present invention as defined in accompanying claims, various modifications may be brought to the arrangements described. In particular the rubber endless strips may assume a shape different from a flat endless shape.

What I claim is:

1. An elastic device for interconnecting a stationary member and a member movable in oscillation with respect to said stationary member, comprising, in combination, a comb-shaped element carried by one of said members the body of which is parallel with the oscillation axis of the oscillating member while the teeth thereof are perpendicular to said oscillation axis an element carried by the other member, extending in a direction perpendicular to said oscillation axis and shaped in register relationship with said teeth so as to allow the relative oscillatory displacement of said elements without said elements touching each other, the so shaped parts of said second element being defined by spaced portions of said element which are perpendicular to said oscillation axis; elastic means extending in parallelism with said oscillation axis and engaging said teeth in a predetermined direction of rotation about said axis and said portions in a reverse direction; and means for holding the ends of said elastic means, whereby, during the oscillation of the oscillating member said teeth and said portions apply on opposite sides of said elastic means forces causing tensional stresses extending along the length thereof and the intensity of which depends on the relative angular amplitude between the two members.

2. An elastic device for interconnecting a stationary member and a member movable in oscillation with respect to said stationary member, comprising, in combination, a comb-shaped element carried by one of said members the body of which is parallel with the oscillation axis of the oscillating member while the teeth thereof are perpendicular to said oscillation axis; an element carried by the other member, extending in a direction perpendicular to said oscillation axis and shaped in register relationship with said teeth so as to allow the relative oscillatory displacement of said elements without said elements touching each other, the so shaped parts of said second element being defined by spaced portions of said element which are perpendicular to said oscillation axis; elastic means extending in parallelism with said oscillation axis and engaging said teeth in a predetermined direction of rotation about said axis and said portions in a reverse direction; means for holding the ends of said elastic means, whereby, during the oscillation of the oscillating member said teeth and said portions apply on opposite sides of said elastic means forces causing tensional stresses extending along the length thereof and the intensity of which depends on the relative angular amplitude between the two members, and an additional element of elastic material secured to one of said parts and adapted to engage the other part only when the two members are near the ends of their relative oscillation.

3. An elastic device for interconnecting a stationary member and a member movable in oscillation with respect to said stationary member, comprising, in combination, a comb-shaped element carried by one of said members the body of which is parallel with the oscillation axis of the oscillating member while the teeth thereof are perpendicular to said oscillation axis; an element carried by the other member, extending in a direction perpendicular to said oscillation axis and shaped in register relationship with said teeth so as to allow the relative oscillatory displacement of said elements without said elements touching each other, the so shaped parts of said second element being defined by spaced portions of said element which are perpendicular to said oscillation axis; elastic means extending in parallelism with said oscillation axis and engaging said teeth in a predetermined direction of rotation about said axis and said portions in a reverse direction; means for holding the ends of said elastic means, whereby, during the oscillation of the oscillating member said teeth and said portions apply on opposite sides of said elastic means forces causing tensional stresses extending along the length thereof and the intensity of which depends on the relative angular amplitude between the two members, and a plurality of additional elements of elastic material secured to one of said parts and adapted to engage in succession the other part when the two members are near the end of their relative oscillation.

4. An elastic device for interconnecting a stationary member and a member movable in oscillation with respect to said stationary member, comprising, in combination, a comb-shaped element carried by one of said members the body of which is parallel with the oscillation axis of the oscillating member, said comb-shaped element being formed with pairs of superposed teeth perpendicular to said oscillation axis, the teeth of each pair defining an open space between them; an element carried by the second member, extending in a direction perpendicular to said oscillation axis through the spaces of said pairs of teeth, integral with a pivotal pin carried by the first member and formed in register relationship with said pairs of teeth with apertures defined by spaced portions of said second element which are perpendicular to said oscillation axis; and an elastic flat endless element formed by a pair of parallel and superposed sheet-shaped parts of elastic material extending in parallelism with the axis of oscillation, the transversal edges of which are interconnected while one of the longitudinal edges of one sheet-shaped part is connected with the facing longitudinal edge of the other sheet-shaped part, said elastic element embracing said second element and being inserted through said spaces for bearing by its outer sides on said teeth, while the elastic connection between the longitudinal edges of its sheet-shaped parts surrounds the pivotal pin of the second element.

5. An elastic device for interconnecting a stationary member and a member movable in oscillation with respect to said stationary member, comprising, in combination, a comb-shaped element carried by one of said members the body of which is parallel with the oscillation axis of the oscillating member, said comb-shaped element being formed with C-shaped teeth located in planes perpendicular to said oscillation axis; an element carried by the second member, extending in a direction perpendicular to said oscillation axis, integral with a pivotal pin carried by the first member and formed in register relationship with said teeth with apertures defined by spaced portions of said second element which are perpendicular to said oscillation axis, parts respectively carried by and parallel to said portions, each of said parts defining an open space with the corresponding portion; and an elastic flat endless element formed by a pair of parallel and superposed sheet-shaped parts of elastic material extending in parallelism with the axis of oscillation, the transversal edges of which are interconnected while one of the longitudinal edges of one sheet-shaped part is connected with the facing longitudinal edge of the other sheet-shaped part, said elastic element simultaneously embracing one of the wings of the C-shaped teeth and the portions of the second element, its outer sides bearing simultaneously on the other wings of said C-shaped teeth and on the parts carried by said portions, while the elastic connection between the longitudinal edges of its sheet-shaped parts surrounds the pivotal pin of the second element.

6. An elastic device, according to claim 5, wherein the lengths of the teeth of the comb-shaped element, of the registering apertures of the second element and the width of the sheet-shaped parts of the elastic flat endless element decrease from the middle transverse line of said elements towards their ends.

7. A vehicle wheel suspension comprising, in combination, a movable axle section extending laterally of the vehicle and having a road wheel mounted at its outer end while its inner end is formed as a pivot-shaped part; a comb-shaped element secured on the vehicle frame longitudinally of the vehicle and pivotally mounting said pivot-shaped part on the vehicle frame about an axis arranged longitudinally of the vehicle while the teeth thereof extend laterally of the vehicle; said axle section being shaped in register relationship with said teeth so as to allow a relative oscillatory movement between said comb-shaped element and said movable axle section without touching each other, the so shaped parts of said axle section being defined by spaced portions of axle section which are perpendicular to said oscillation axis; elastic means extending in parallelism with said oscillation axis and engaging said teeth in a predetermined direction of rotation about said axis and said portions in a reverse direction; and means for holding the ends of said elastic means.

8. A vehicle wheel suspension comprising, in combination, a movable axle section extending laterally of the vehicle and having a road wheel mounted at its outer end while its inner end is formed as a pivot-shaped part; a comb-shaped element secured on the vehicle frame longitudinally of the vehicle and pivotally mounting said pivot-shaped part on the vehicle frame about an axis arranged longitudinally of the vehicle while the teeth thereof extend laterally of the vehicle; said comb-shaped element being formed with pairs of superposed teeth perpendicular to said oscillation axis, the teeth of said pairs defining between them spaces through which extends said axle section while said axle section is formed in register relationship with said pairs of teeth with apertures defined by spaced portions of said axle section which are perpendicular to said oscillation axis; and an elastic flat endless element formed by a pair of parallel and superposed sheet-shaped parts of elastic material extending in parallelism with the axis of oscillation, the transversal edges of which are interconnected while one of the longitudinal edges of one sheet-shaped part is connected with the facing longitudinal edge of the other sheet-shaped part, said elastic element embracing said axle section and being inserted through said spaces for bearing by its outer sides on said teeth while the elastic connection between the longitudinal edges of its sheet-shaped parts surrounds the pivot-shaped part of said axle section.

9. A vehicle wheel suspension comprising, in combination, a movable axle section extending laterally of the vehicle and having a road wheel mounted at its outer end while its inner end is formed as a pivot-shaped part; a comb-shaped element secured on the vehicle frame longitudinally of the vehicle and pivotally mounting said pivot-shaped part on the vehicle frame about an axis arranged longitudinally of the vehicle while the teeth thereof extend laterally of the vehicle; said comb-shaped element being formed with C-shaped teeth located in planes perpendicular to said oscillation axis while said axle section is formed in register relationship with said teeth with apertures defined by spaced portions of said axle which are perpendicular to said oscillation axis, parts respectively carried by and parallel to said portions, each of said parts defining an open space with the corresponding portion; and an elastic flat endless element formed by a pair of parallel and superposed sheet-shaped parts of elastic material extending in parallelism with the axis of oscillation, the transversal edges of which are interconnected while one of the longitudinal edges of one sheet-shaped part is connected with the facing longitudinal edge of the other sheet-shaped part, said elastic element simultaneously embracing one of the wings of the C-shaped teeth and the portions of the second element, its outer sides bearing simultaneously on the other wings of said C-shaped teeth and on the parts carried by said portions while the elastic connection between the longitudinal edges of its sheet-shaped parts surrounds the pivot-shaped part of said axle section.

References Cited in the file of this patent

UNITED STATES PATENTS

| Number | Name | Date |
| --- | --- | --- |
| 1,445,970 | O'Connor | Feb. 20, 1923 |
| 1,446,431 | Parnacott | Feb. 20, 1923 |
| 1,706,556 | Wright | Mar. 26, 1929 |
| 1,837,510 | Wayne et al. | Dec. 22, 1931 |
| 1,943,887 | Dowd | Jan. 16, 1934 |
| 2,073,873 | Kliesrath | Mar. 16, 1937 |
| 2,104,687 | Zahn | Jan. 4, 1938 |

FOREIGN PATENTS

| Number | Country | Date |
| --- | --- | --- |
| 23,922 | France 1st. add. to 528,289 | Sept. 19, 1921 |
| 648,974 | Germany | Aug. 12, 1937 |
| 724,359 | Germany | Aug. 24, 1942 |